US012392475B2

(12) United States Patent
Wang et al.

(10) Patent No.: US 12,392,475 B2
(45) Date of Patent: Aug. 19, 2025

(54) LED LIGHTING DEVICE

(71) Applicant: JIAXING SUPER LIGHTING ELECTRIC APPLIANCE CO., LTD, Jiaxing (CN)

(72) Inventors: Mingbin Wang, Guizhou (CN); Zecheng Jing, Jiaxing (CN); Jian Lu, Jiaxing (CN); Jifeng Xu, Zhejiang (CN)

(73) Assignee: JIAXING SUPER LIGHTING ELECTRIC APPLIANCE CO., LTD, Jiaxing (CN)

( * ) Notice: Subject to any disclaimer, the term of this patent is extended or adjusted under 35 U.S.C. 154(b) by 0 days.

(21) Appl. No.: 18/710,176

(22) PCT Filed: Nov. 18, 2022

(86) PCT No.: PCT/CN2022/132758
§ 371 (c)(1),
(2) Date: May 14, 2024

(87) PCT Pub. No.: WO2023/088403
PCT Pub. Date: May 25, 2023

(65) Prior Publication Data

US 2025/0035286 A1 Jan. 30, 2025

(30) Foreign Application Priority Data

Nov. 18, 2021 (CN) ......................... 202111375095.1
Jan. 20, 2022 (CN) ......................... 202210065030.5
Nov. 16, 2022 (CN) ......................... 202211432560.5

(51) Int. Cl.
*F21V 7/00* (2006.01)
*F21V 19/00* (2006.01)
*F21Y 115/10* (2016.01)

(52) U.S. Cl.
CPC .......... *F21V 7/0008* (2013.01); *F21V 19/003* (2013.01); *F21Y 2115/10* (2016.08)

(58) Field of Classification Search
CPC ...... F21V 7/0008; F21V 19/003; F21V 13/00; F21V 13/02; F21V 13/04; F21Y 2115/10; F21S 2/00; F21S 8/00
See application file for complete search history.

(56) References Cited

U.S. PATENT DOCUMENTS 7,874,697 B2 * 1/2011 Biebel ................... F21V 29/505 362/228
8,761,565 B1 * 6/2014 Coleman ............. G02B 6/0045 362/628
2018/0283652 A1 * 10/2018 Lee ......................... F21S 43/14

FOREIGN PATENT DOCUMENTS

CN 101270855 A 9/2008
CN 203431591 U 2/2014
CN 106402697 A 2/2017
CN 208011440 U 10/2018

(Continued)

*Primary Examiner* — Bao Q Truong
(74) *Attorney, Agent, or Firm* — Simon Kuang Lu

(57) ABSTRACT

An LED lighting device includes a seat (1), a first optical member (3), a first light source (21) and a second light source (22). The seat (1) includes a bottom portion (11) and a side portion (12). The first optical member (3) is disposed on the seat (1) and covers the bottom portion (11). The first light source (21) is disposed between the bottom portion (11) of the seat (1) and the first optical member (3). The second light source (22) is disposed on the side portion (12) of the seat (1).

10 Claims, 8 Drawing Sheets

(56) References Cited

FOREIGN PATENT DOCUMENTS

| | | | |
|---|---|---|---|
| JP | 2014013744 | A | 1/2014 |
| JP | 2015207493 | A | 11/2015 |

* cited by examiner

LED LIGHTING DEVICE

CROSS-REFERENCE TO RELATED APPLICATIONS

This application is a U.S. 371 national stage of prior application number PCT/CN2022/132758, filed on 2022 Nov. 18, which claims foreign priority to the following Chinese Patent Applications Nos.: CN 202111375095.1 filed on 2021 Nov. 18; CN 202210065030.5 filed on 2022 Jan. 20, and CN 202211432560.5 filed on 2022 Nov. 16, the disclosures of which are incorporated herein in their entirety by reference.

FIELD OF THE INVENTION

The disclosure relates to LED lighting technology, particularly to an LED lighting device.

BACKGROUND OF THE INVENTION

LED lighting is widely used because of its advantages such as energy saving and long life. LED lamps in the prior art commonly include panel lamps and grille lamps.

A panel lamp in the prior art usually includes a light strip, a bottom frame, a light guide plate and a diffusion plate. The light strip is arranged on a side portion of the bottom frame to provide lateral light emission. The light emitted by the light strip passes through the light guide plate and then is emitted out of the diffusion plate. Such a panel lamp has the following shortcomings: after the light emitted by the light strip passes through the light guide plate and the diffusion plate, the light loss is large, resulting in low light emission efficiency of the panel lamp; the cost of the light guide plate is high, which is disadvantageous to the cost of the panel lamp; and glare control of the panel lamp is generally poor.

A grille lamp in the prior art includes a bottom frame, a light source (the light source can be a light strip, a fluorescent tube or an LED light tube) and a grille. The light source is fixed on the bottom frame, and a grille is provided on the light-emitting side of the light source. Such a grille lamp has the following shortcomings: the way of setting the grille is disadvantageous to the height control of the grille lamp, which increases the packaging and transportation costs; the cost of the grille is high, which is disadvantageous to the cost control of the entire lamp; the light loss is large when disposing the grille; and dark zones are easily formed at the grille, which is disadvantageous to light emission.

In summary, in view of the shortcomings and defects of LED lighting devices in the prior art, how to design an LED lighting device to solve the problem of glare is a technical problem that needs to be solved by those skilled in the art.

SUMMARY OF THE INVENTION

Many embodiments of the disclosure are briefly described herein. However, the phrases used here are only used to describe certain embodiments disclosed in this specification (whether or not included in the claims), and are not a complete description of all possible embodiments. Various features or aspects of certain embodiments of the disclosure may be combined in different ways to form an LED lighting device or a part thereof.

Embodiments of the present invention provide a new LED lighting device and features in various aspects to solve the above problems.

The disclosure provides an LED light source, which includes:

- a seat, comprising a bottom portion and a side portion;
- a first optical member, disposed on the seat, and covering the bottom portion;
- a first light source, disposed between the bottom portion of the seat and the first optical member; and
- a second light source, disposed on the side portion of the seat.

In an embodiment of the disclosure, the first optical member includes a first area and a second area, and the first area corresponds to the seat to be disposed at an interval.

In an embodiment of the disclosure, the first optical member at least emits part of light emitted by the first light source, and the first optical member at least reflects light emitted by the second light source.

Embodiments of the present invention provide an LED lighting device, which includes:

- a seat, comprising a bottom portion and a side portion;
- a light source, comprising a first light source, disposed on the bottom portion of the seat and a second light source disposed on the side portion of the seat;
- a reflector; and
- a first optical member, disposed on the seat and covering the first light source;
- wherein the second light source is located on another side of the first optical member, which is opposite to the first light source, and the reflector reflects at least part of light emitted by the second light source.

In an embodiment of the disclosure, the first optical member includes a first area and a second area, and the first area corresponds to the seat to be disposed at an interval.

In an embodiment of the disclosure, the first optical member at least emits part of light emitted by the first light source, and the first optical member at least reflects light emitted by the second light source.

An embodiment of the disclosure further includes a second optical member, wherein the second optical member is fixed by at least one of the first optical member and the reflector.

In an embodiment of the disclosure, the second optical member and the first optical member are integratedly formed with one or more materials.

In an embodiment of the disclosure, the second optical member and the reflector are integratedly formed with one or more materials.

In an embodiment of the disclosure, the second optical member, the reflector and the first optical member are integratedly formed with one or more materials.

In the embodiments of the disclosure, the second optical member, the reflector and the first optical member are integratedly formed with one or more materials. In comparison with the prior art, the present disclosure has the following advantageous technical effects: the light emission of the first light source and the second light source forms optical complementarity in the third area to avoid forming a dark zone. All the light generated from the working second light source is emitted from the LED lighting device after being reflected once or multiple times without direct light emission so that glare of the whole lamp can be better controlled.

DETAILED DESCRIPTION OF THE INVENTION

Figure 1:
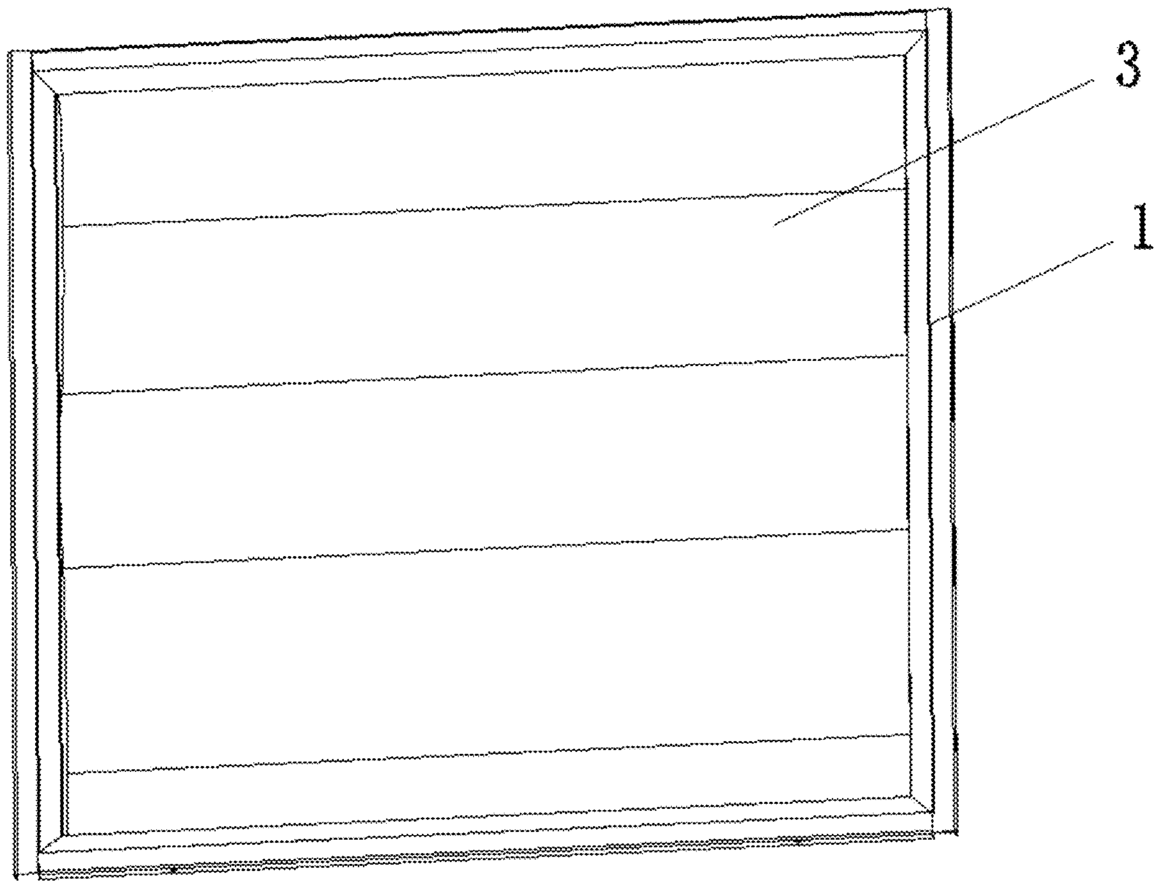
FIG. 1 is a perspective structural schematic view of an embodiment of the LED lighting device of the disclosure.
Figure 2:
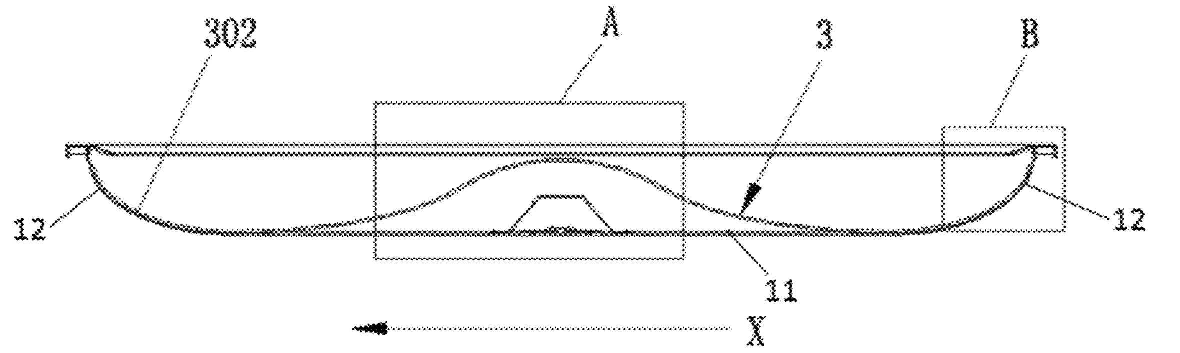
FIG. 2 is a cross-sectional structural schematic view of an embodiment of the LED lighting device of the disclosure.

In the following descriptions, please refer to the appended figures, the appended figures depict various embodiments of the disclosure. It should be understood that there still are other embodiments which can be implemented with changes of modules, units, electrics or operations and without violating the spirit and scope of the disclosure. The following descriptions should not be deemed to be limitative and the scope of the embodiments of the disclosure is limited by the claims only. The terms used here are used for purpose of illustrating specific embodiments only, but not for limiting the disclosure. The same labels in the figures indicate the same element.

It will be understood that, although the terms first, second, third etc. may be used herein to describe various elements or parameters, and these elements or parameters should not be limited by these terms. Unless the context indicates otherwise, these terms are only used to distinguish one element or parameter from another element or parameter. For example, a first element can be named as "second element". Similarly, a second element can also be named as "first element". This will not detach the scope of the described embodiments. When used in the description, the term "and/or" includes one or more arbitrary combinations in related described solutions.

It will be understood that when an element is referred to as being "on" another element or extended "onto" another element, it can be directly on the other element or an intervening element may be present. In contrast, when an element is referred to as being "directly on" another element or "directly extended onto another element, there are no intervening element present. It will further be understood that when an element is referred to as being "connected" or "coupled" to or "on" another element, it can be directly connected or coupled to or on the other element or an intervening element may be present. In contrast, when an element is referred to as being "directly connected" or "directly coupled" to another element, there are no intervening element present.

Relative terms, such as "under", "over", "upper", "lower", "horizontal", "vertical" and the like, may be used herein for ease of description to describe one element's, layer's or area's relationship to another element, layer or area as illustrated in the figures. It will be understood that these terms are intended to encompass different orientations of the device in use or operation in addition to the orientation depicted in the figures. In the disclosure, the terms "horizontal", "vertical" and "parallel" are defined to include a range of ±10% on the standard definitions. For example, "vertical" usually indicates 90 degrees relative to a reference line, but in the disclosure, "vertical" indicates to include from 80 degrees to 100 degrees.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will also be understood that, when used herein, the terms "comprise", "contain", "include", and "and/or" designate stated features, integers, steps, operations, elements, and/or parts, but do not exclude the presence or addition of one or more other features, integers, steps, operations, elements, parts and/or combinations thereof.

Unless otherwise defined, all terms (including technical and scientific terms) used herein have the same meaning as commonly understood by one of ordinary skill in the art to which this invention belongs. It will also be understood that the terms used herein shall be construed to have a meaning consistent with their meaning in the context of this specification and in the relevant fields, and shall not be construed in an idealized or overly formal sense, except being clearly limitedly used herein.

Comparative quantitative terms such as "less than" and "greater than" are intended to encompass equal concepts unless expressly stated otherwise. As an example, "less than" can mean not only "less than" in the strictest mathematical sense, but also "less than or equal to."

As shown in FIGS. 1-7, an embodiment of the disclosure provides an LED (light-emitting diode) lighting device, which includes a seat 1, a light source 2, a first optical member 3 and a power supply 4. The light source 2 is electrically connected to the power supply 4. The light source 2 is disposed on the seat 1.

In the embodiment, the seat 1 includes a bottom portion 11, two side portions 12, and two sidewalls 14. In the first direction X, the two side portions 12 are located on two sides of the bottom portion 11. In the second direction Y perpendicular to the first direction X, the two sidewalls 14 are located on two sides of the bottom portion 11. The light source 2 includes a first light source 21 disposed on the bottom portion 11 of the seat 1. The first optical member 3 is disposed on the seat 1 and covers the first light source 21. A direction directed from the bottom portion 11 toward the first optical member 3 serves as the main light-emitting direction of the LED lighting device. A surface of the first optical member 3, which is away from the bottom portion 11, serves as the light-emitting surface. A surface of the first optical member 3, which is close to the bottom portion 11, serves as the incident surface. The first light source 21 emits light out from the LED lighting device after passing through the first optical member 3. In the embodiment, the first optical member 3 at least provides functions of light permeability and light diffusion.

The light source 2 may further include a second light source 22 disposed on the side portions 12 of the seat 1. In an embodiment, while the second light source 22 is working, at least 90% of its luminous flux is emitted out from the LED lighting device through the first optical member 3. In an embodiment, while the second light source 22 is working, all of its luminous flux is emitted out from the LED lighting device through the first optical member 3. In the luminous flux emitted by the working second light source 22, a part thereof is reflected by the first optical member 3 to be emitted out from the LED lighting device, and another part thereof is emitted out from the first optical member 3 through the first optical member 3 and with being reflected by the seat 1. The first light source 21 and the second light source 22 are substantially the same in structure, for example, they both include a circuit board and LED chips, so they will not be repeated herein. The first light source 21 and the second light source 22 are separately located on different sides of the first optical member 3, and the first light source 21 and the second light source 22 separately utilize different properties of the first optical member 3 to emit light. For example, the first light source 21 mainly utilizes the light permeability of the first optical member 3 to emit light, and the second light source 22 mainly utilizes the light permeability and the reflection of the first optical member 3 to emit light.

After the first optical member 3 is installed on the seat 1, it has a first area 301 and a second area 302 in the first direction X. An interval is kept between the first area 301 and the bottom portion 11 of the seat 1 to provide an accommodating space 304. The first light source 21 and/or the power supply 4 are accommodated in the accommodating space 304. The region formed by the boundary of the light beam angle of the first light source 21 in the first direction X being projected onto the first optical member 3 can be regarded as the first are 301.

The luminous flux generated by the first light source 21 and the second light source 22 may be the same or different. In an embodiment, the luminous flux generated by the working second light source 22 is greater than the luminous flux generated by the working first light source 21, and the second area 302 is greater than the first area 301 in area, so as to balance the illuminance difference between the surfaces of the first area 301 and the second area 302.

The minimum distance between the first area 301 and the bottom portion 11 of the seat 1 is greater than 5 mm to provide a sufficient space to the accommodating space 304. The power supply 4 being placed in the accommodating space 304 must guarantee that the distance between the first area 21 and the bottom portion 11 is greater than the height of the power supply 4.

Figure 3:
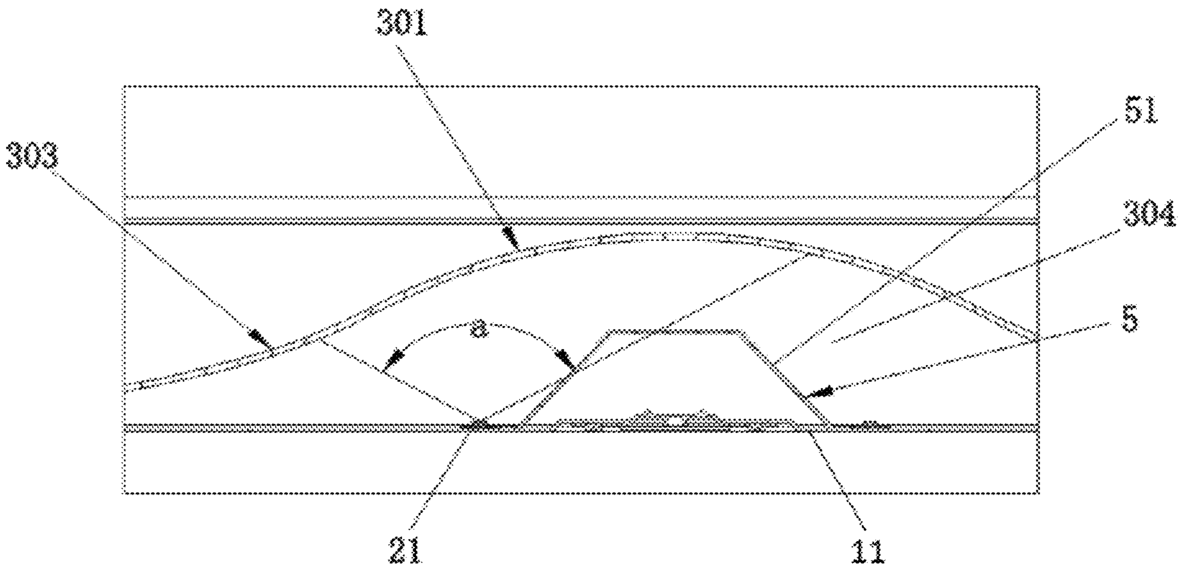
FIG. 3 is an enlarged view of part A in FIG. 2.
Figure 4:
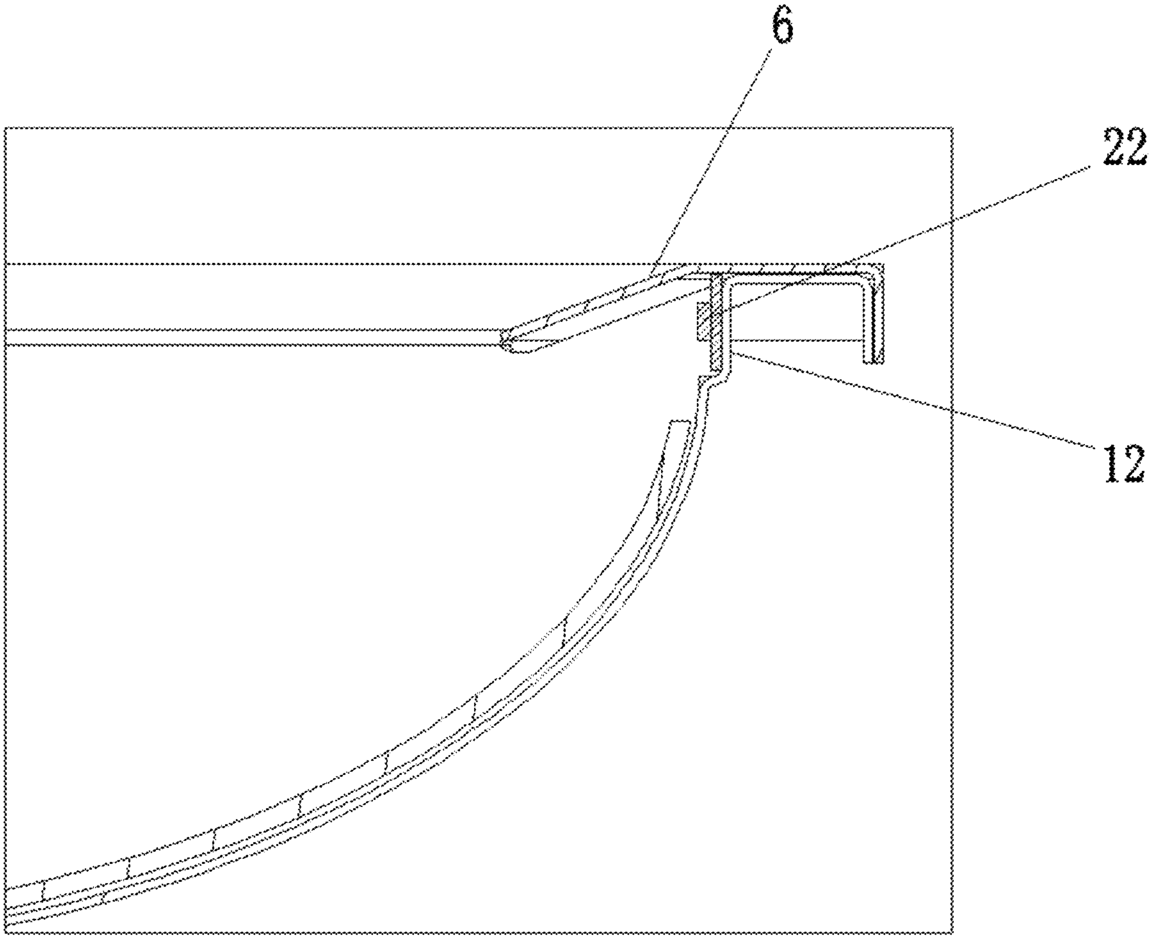
FIG. 4 is an enlarged view of part B in FIG. 2.
Figure 5:
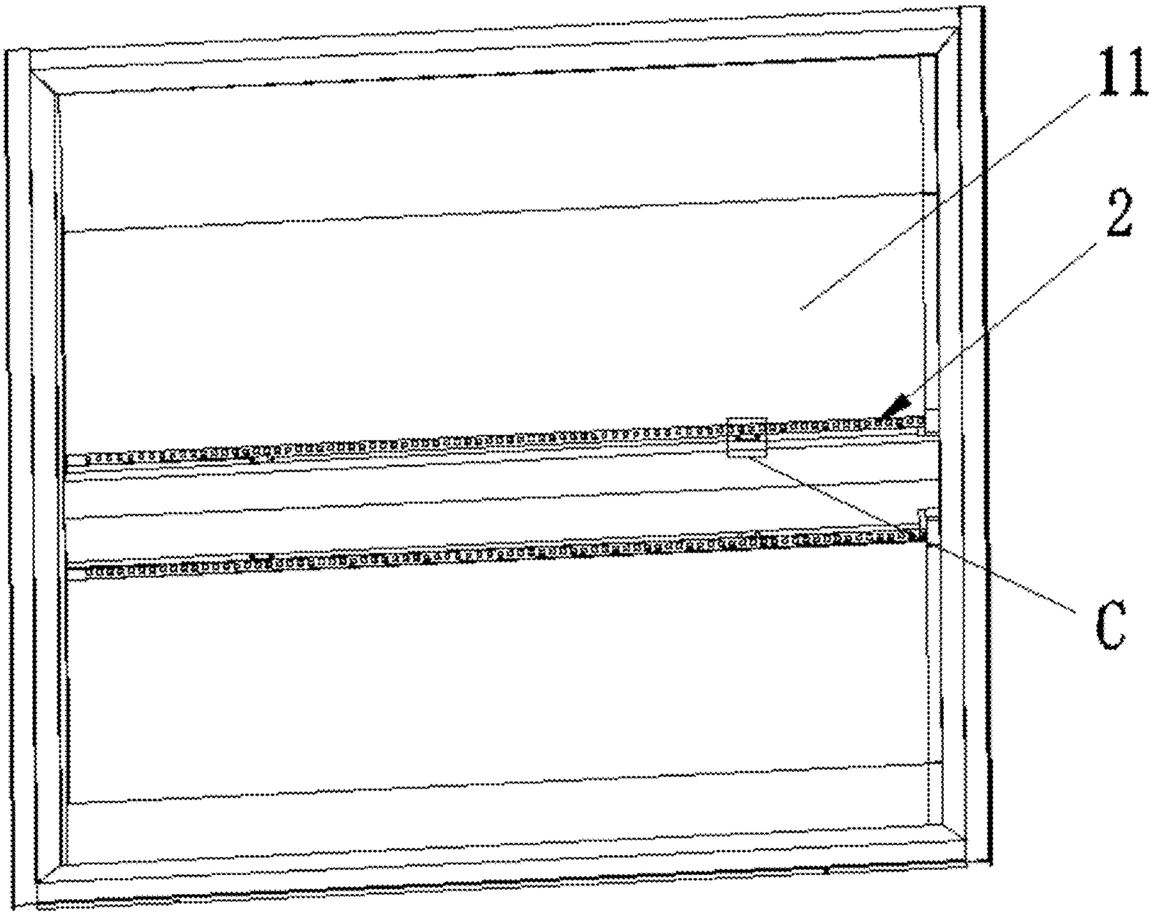
FIG. 5 is a perspective structural schematic view of an embodiment of the LED lighting device of the disclosure without the first optical member.
Figure 6:
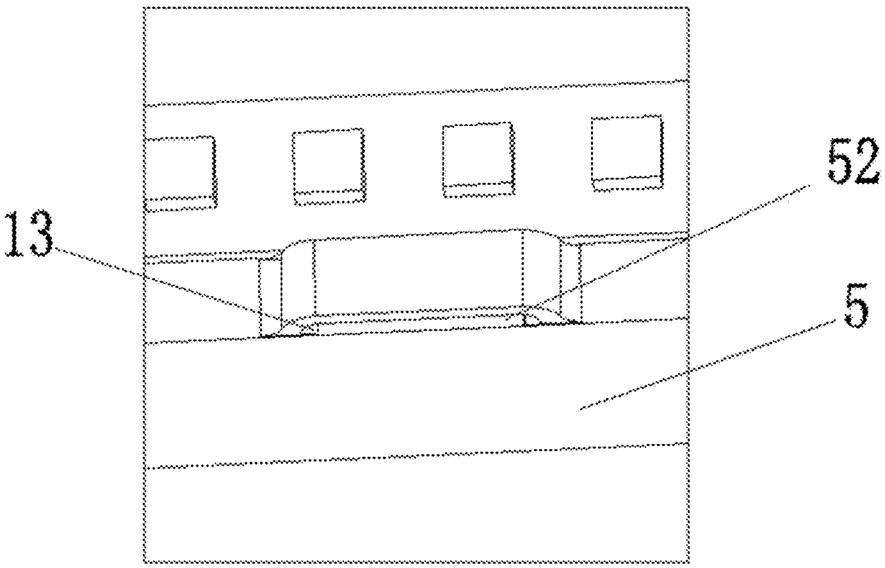
FIG. 6 is an enlarged view of part C in FIG. 5.
Figure 7:
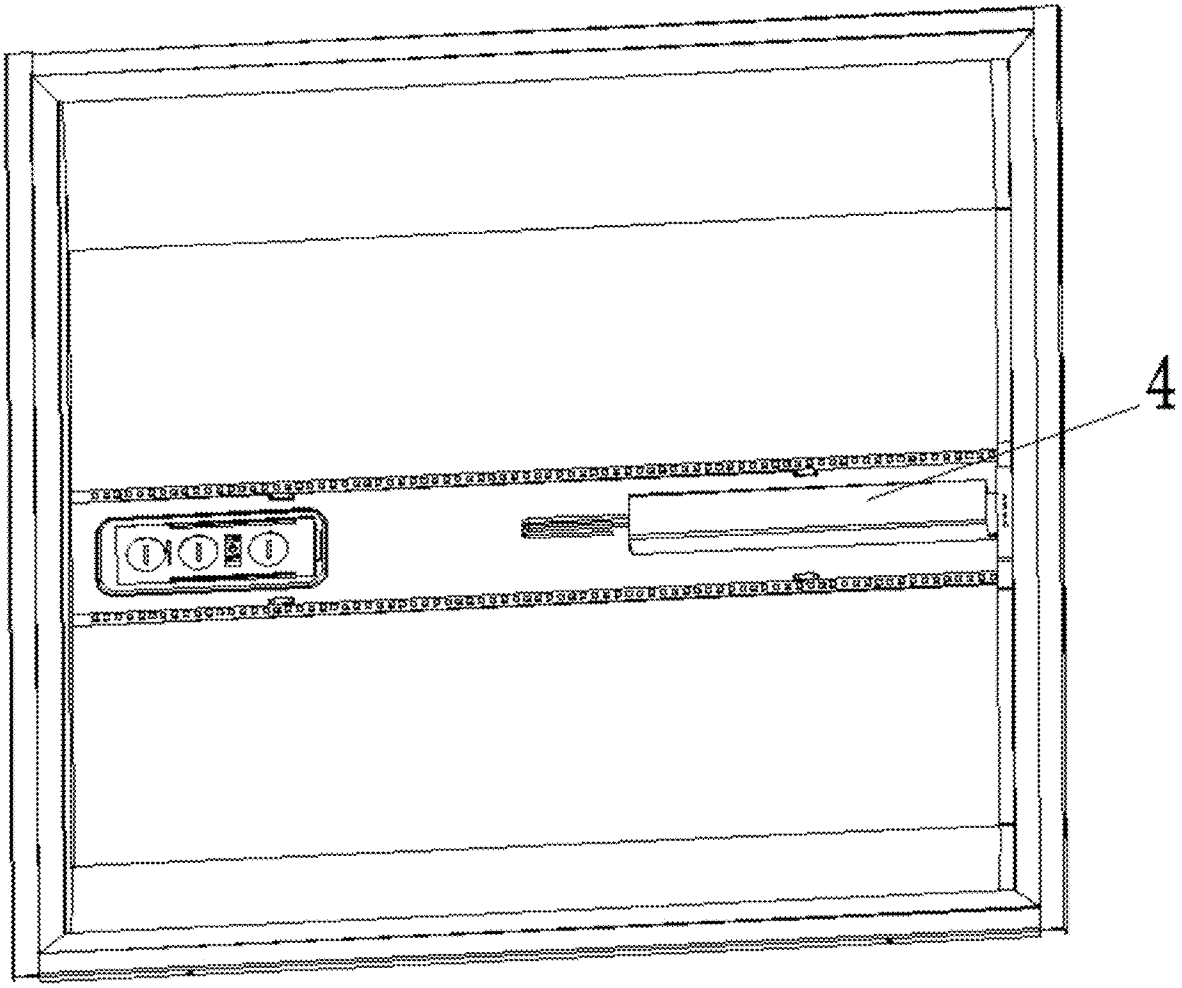
FIG. 7 is a perspective structural schematic view of FIG. 5 without the power cap.
Figure 8:
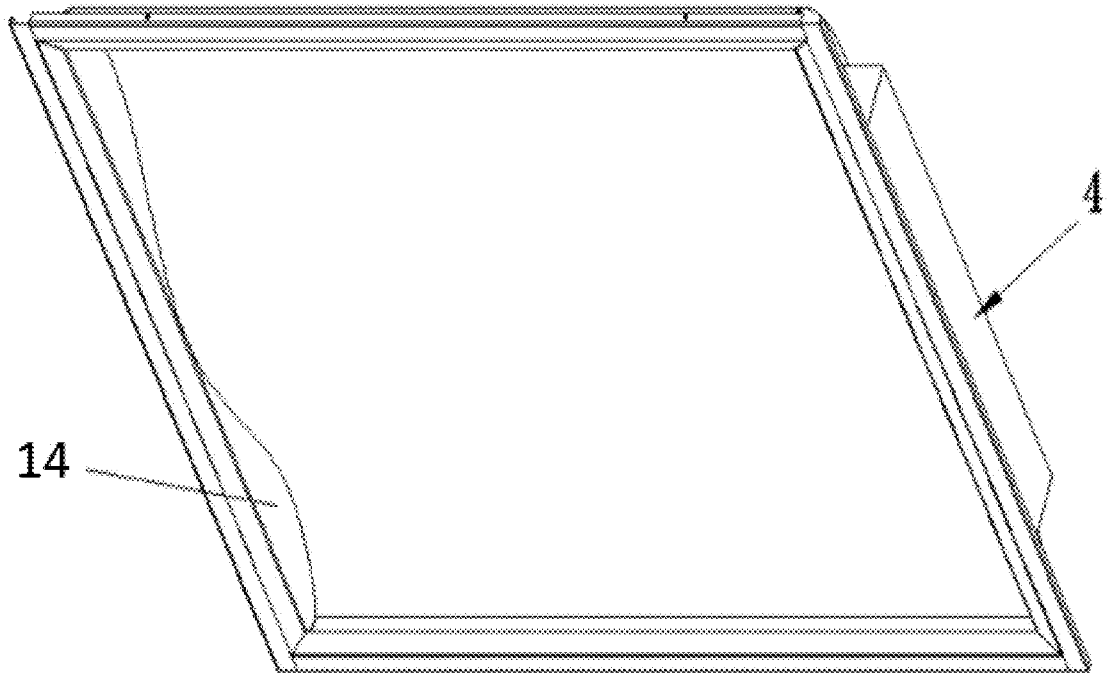
FIG. 8 is a perspective structural schematic view of an embodiment of the LED lighting device of the disclosure.
Figure 9:
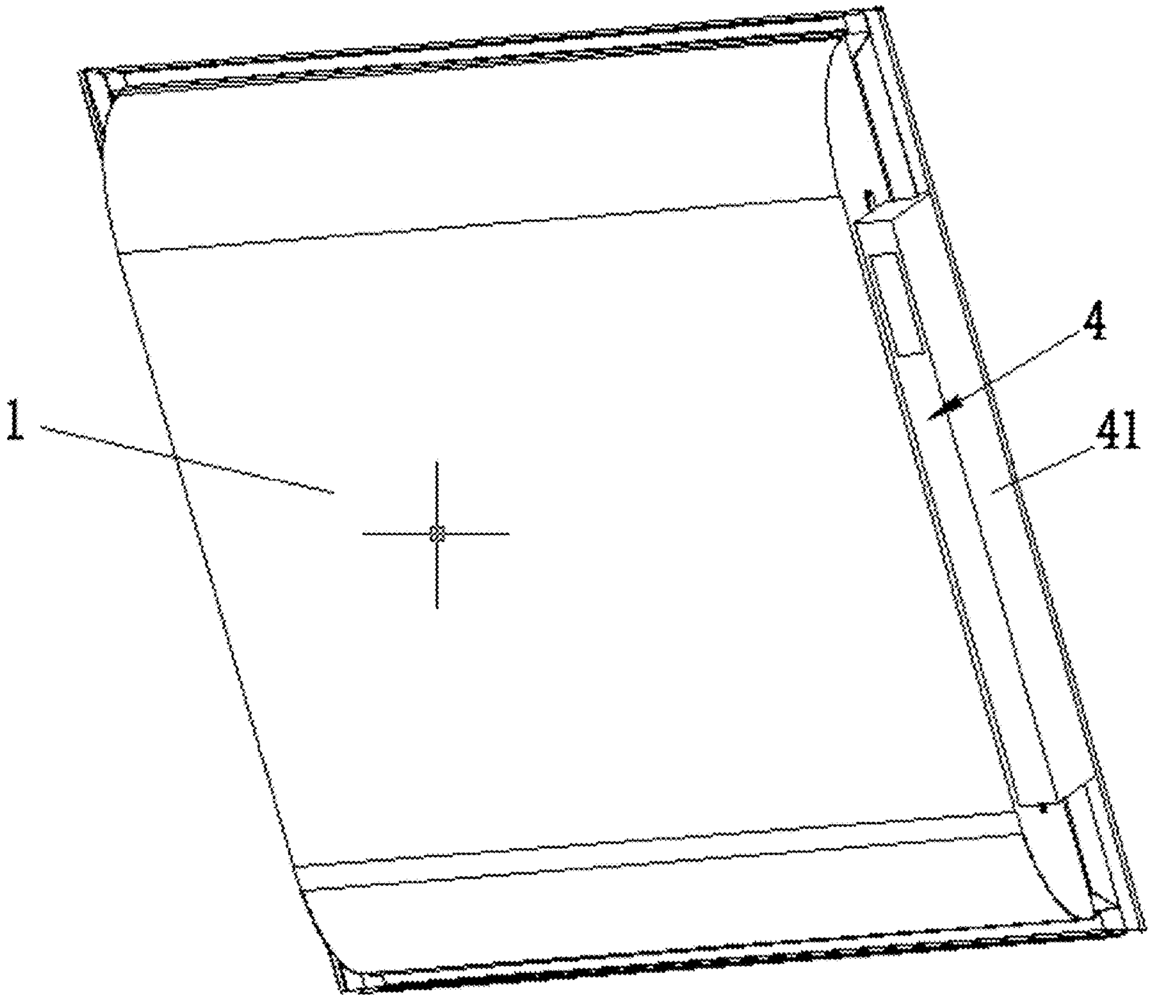
FIG. 9 is another perspective structural schematic view of an embodiment of the LED lighting device of the disclosure.
Figure 10:
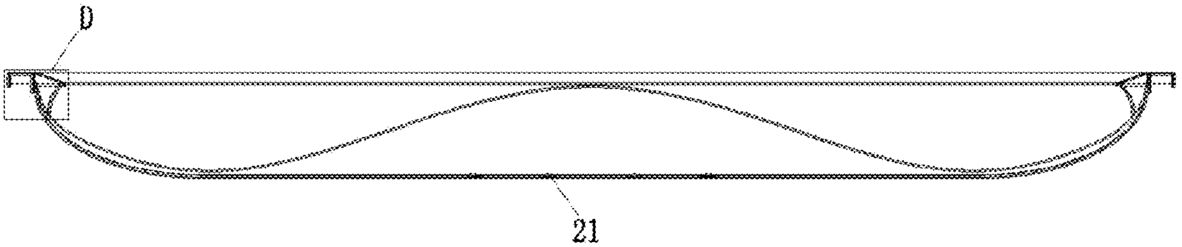
FIG. 10 is a cross-sectional structural schematic view of an embodiment of the LED lighting device of the disclosure.
Figure 11:
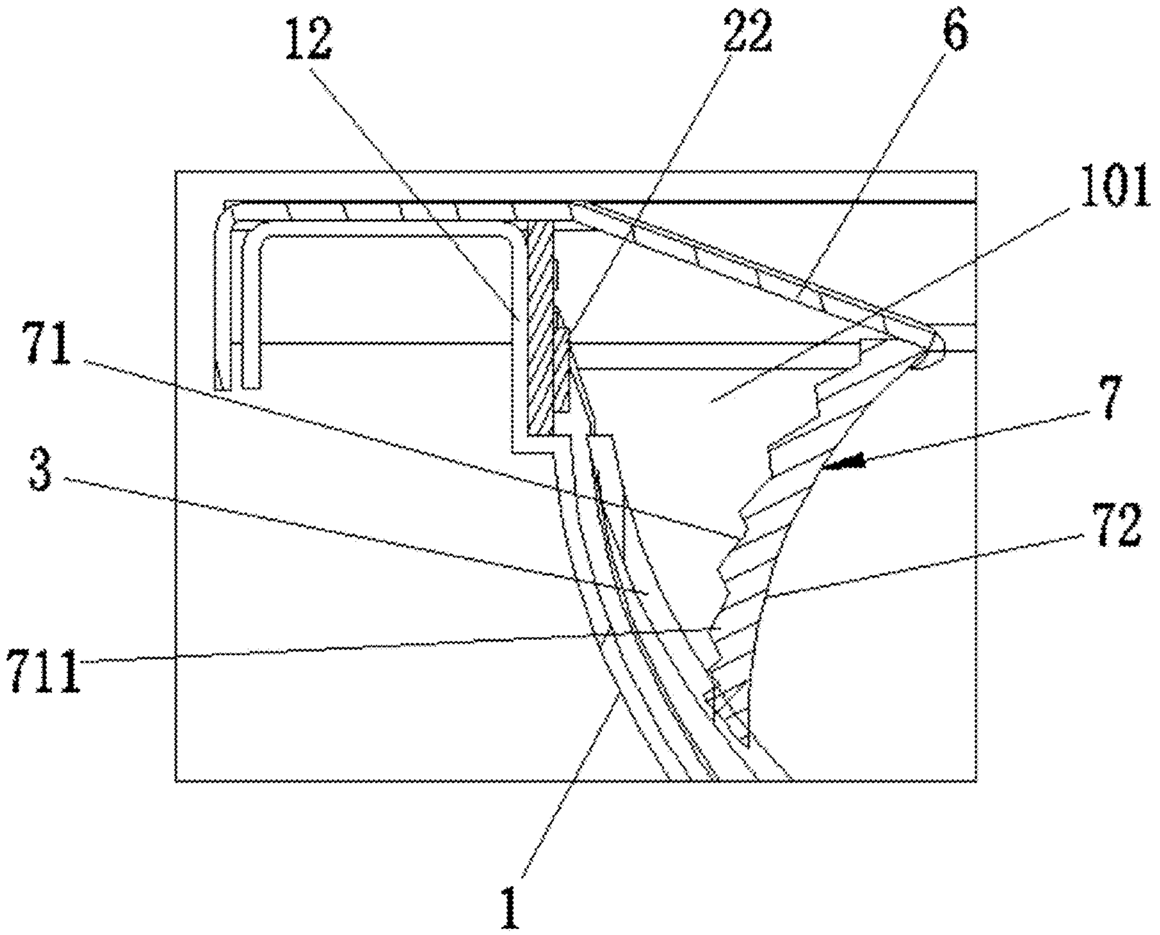
FIG. 11 is an enlarged view of part D in FIG. 10.
Figure 12:
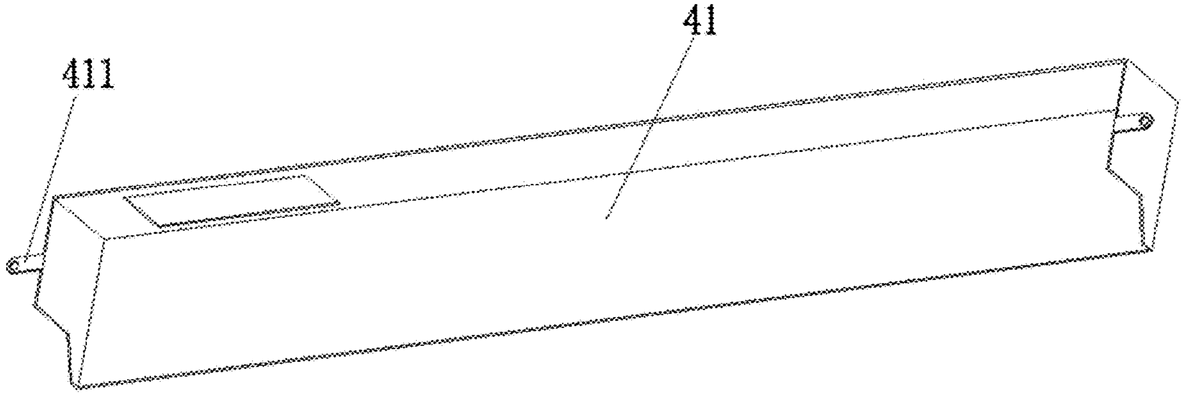
FIG. 12 is a perspective structural schematic view of an embodiment of the power box of the disclosure.

The second area 302 is a region which only or mainly receive the light directly emitted from the working second light source 22 to the first optical member 3 (the light which comes from the second light source 22 and is optically processed such as reflected to be emitted to the first optical member 3 can also be regarded as the light directly emitted from the working second light source 22 to the first optical member 3), and it is not in the range of the light beam angle (as shown in FIG. 3, a is the light beam angle) of the first light source 21. In other words, the light directly emitted from or optically processed to a region of the first optical member 3, and the region excluding a part in the range of the light beam angle of the first light source 21 constitutes the second area 302. In the embodiment, the ratio of the average illuminance of surfaces of the first area 301 to the second area 302 is 1:0.5-2 to guarantee evenness of light emission of the first area 301 and the second area 302 so as to improve the light-emitting effect of the first optical member 3. In an embodiment, the ratio of the average illuminance of surfaces of the first area 301 to the second area 302 is 1:0.5-1.2.

In an embodiment, a third area 303 may be further disposed. In an embodiment, the third area 303 is an area between the first area 301, and the second area 302 in the first direction X. In an embodiment, the third area 303 is an overlapping portion of the area formed by the boundary of the light beam angle of the first light source 21 in the first direction X being projected onto the first optical member 3 and the area of the first optical member 3 to which the light generated from the working second light source 22 being directly emitted or optically processed.

In an embodiment, the ratio of the average illuminance of surfaces of the third area 303 to the first area 301 is 1:0.6-1.5 to guarantee evenness of light emission of the third area 303 and the first area 301. In an embodiment, the ratio of the average illuminance of surfaces of any two of the first area 301, the second area 302, and the third area 303 is 1:0.4-2.2, so that evenness of light emission of the surface of the first optical member 3 can be guaranteed to improve the light-emitting effect. In an embodiment, the ratio of the average illuminance of surfaces of any two of the first area 301, the second area 302, and the third area 303 is 1:0.5-2.

In an embodiment, the light emission of the first area 21 and the second area 22 forms optical complementarity in the third area 303 to avoid forming a dark zone.

All the light generated from the working second light source 22 is emitted out of the LED lighting device after being reflected once or multiple times without direct light emission so that the glare of the whole lamp can be better controlled.

In an embodiment, after the light generated from the working first light source 21 is emitted out of the first area 301 or the second area 302, at least part thereof is projected to the second area 302, then reflected from the second area 302, and finally emitted out of the LED lighting device, so that glare of the whole lamp can be better controlled.

In the embodiment, the first optical member 3 adopts a diffuser which may be made of acrylic or plastic material to possess functions of diffusion, permeability and reflection.

The second area 302 of the first optical member 3 is attached to the bottom portion 11 of the seat 1 or a certain interval is kept therebetween. Alternatively, part of the second area 302 is attached to the bottom portion 11 of the seat 1 and an interval is kept between another part thereof and the bottom portion 11 of the seat 1. When at least part of the second area 302 is attached to the bottom portion 11 of the seat 1, when the second light source 22 is attached to the part of the second area 302 attached to the bottom portion 11, interfaces penetrated by light can be decreased to reduce light loss.

The first optical member 3 forms both a first curved surface in the first area 301 and a second curved surface in the second area 302. The first curved surface is a convex surface and the second curved surface is a concave surface. A smooth transition is intervened between the first curved surface and the second curved surface to avoid forming an angle or a tip. In the embodiment, the first optical member 3 is greater than the seat 1 in thermal expansion coefficient. When the LED lighting device is working, the light source 2 and the power supply 4 will generate a large amount of heat to possibly cause excessive expansion and deformation of the first optical member 3. The arrangement of the first curved surface and the second curved surface can change the direction of thermal expansion of the first optical member 3 to reduce the influence resulting from the thermal expansion.

In the embodiment, the LED lighting device may further include a reflector 6. The reflector 6 is fixed on the side portion 12 of the seat 1 and corresponds to the second light source 22. At least part of luminous flux generated by the working second light source 22 is reflected to the first optical member 3 by the reflector 6. In an embodiment, at least part of luminous flux generated by the working second light source 22 is reflected to the first optical member 3 by the reflector 6. The reflector 6 can prevent the LED lighting device from emitting light directly from the second light source 22, so that glare can be effectively controlled to make the unified glare rating less than a specific value (for example, a unified glare rating (UGR) less than 20).

In the embodiment, the LED lighting device may further include a power cap 5. The power cap 5 is disposed in the accommodating space 304 and fixed to the bottom portion 11 of the seat 1. A space accommodating the power supply 4 is formed between the power cap 5 and the bottom portion 11. In comparison with disposing the power supply 5 on the back of the seat 1, the power supply 4 disposed as the embodiment will not occupy the height space of the LED lighting device. This is advantageous to size control which can reduce packaging and transportation costs.

The power cap 5 has two sets of sidewalls 51. The first light source 21 is disposed with two sets which are separately located on two sides of the power cap 5 and correspond to the two sets of sidewalls 51 of the power caps 5. At least part of the light generated from the working first light source 21 is emitted to the first area 301 with being reflected by the sidewalls 51 of the power cap 5. The power cap 5 can prevent the light emission of the first light source 21 from concentrating at the central zone of the first area 301 to form local bright light so as to be advantageous to the control of evenness of light emission of the first optical member 3.

The power cap 5 is disposed with an inserting wall 52. The seat 1 is disposed with an inserting hole 13. The power cap 5 can be fixed to the seat 1 by inserting the inserting wall 52 of the power cap 5 into the inserting hole 13 of the seat 1. In some embodiments, the power cap 5 may also be fixed to the seat 1 by screws, rivets or glue, and they will not be further described.

As shown in FIGS. 8-12, in an embodiments, the power supply 4 is disposed on the back of the LED lighting device, namely, the other side opposite to the seat 1. In other words, the power supply 21 and the light source (the first light source 21 and the second light source 22) are separately located on different sides of the seat 1. The power supply 4 disposed on the back of the seat 1 can eliminate a dark zone formed by the power supply disposed on the front to occupy the light-emittable area of the light-emitting surface.

The power supply 4 is limited within the range in the thickness direction of the seat 1. That is, the power supply 4 does not exceed the top or the bottom of the seat 1 in the thickness direction. Thus, the power supply 4 does not additionally occupy the height or thickness size of the LED lighting device to be advantageous to the control of height or thickness of the LED lighting device. In addition to thickness, the edge of the power supply 4 is configured to be substantially flush with the edge of the LED lighting device. The present embodiment as an example, the long side of the power supply 4 is flush with one lateral side of the LED lighting device or slightly inward moves toward the device center (with keeping a parallel relationship with the lateral side of the LED lighting device), so that users are hard to see the power supply 4 body from the light-emitting surface to maintain appearances.

The power supply 4 includes a power box 41 fixed to the seat 1. When the power box 41 is fixed to the seat 1, a space accommodating electronic components of the power supply 4 is formed therebetween.

The power box 41 includes a connecting portion 411 attached to the sidewall 14 of the seat 1. In an embodiment, the connecting portion 411 is fixed to the sidewall 14 of the seat 1 by welding. In an embodiment, the connecting portion 411 is disposed with fixing holes. The power box 41 can be fixed to the sidewall 14 of the seat 1 by using bolts to pass through the fixing holes. In an embodiment, the connecting portion 411 is fixed to the sidewall 14 of the seat 1 by engagement.

The length direction of the power box 41 is extended along the optical axis direction of the second light source 22 and accounts for at least 50% of the width size of the seat 1 to increase the structural strength of the seat 1 in the width direction.

As shown in FIGS. 8-11, in an embodiment, a second optical member 7 may be further included. The second optical member 7 is disposed outside the second light source 22 and approximately located on the light-emitting side of the second light source 22. The second optical member 7 further limits the second light source 22 in a closed space 101 not to make the second light source 22 exposed so as to prevent bugs from entering and shade the light emission of the second light source 22 or form electric isolation to the second light source 22 to avoid electric shock.

In detail, edges of two sides of the second optical member 7 in the thickness direction of the LED lighting device (i.e., two sides in the width direction of the second optical member 7) separately contact or abut against the reflector 6 and the first optical member 3. Two sides in the length direction of the second optical member 7 separately contact or abut against the sidewall 14 of the seat 1. That is, the closed space 101 is formed among the reflector 6, the second optical member 7, the first optical member 3, the side portion 12 of the seat 1 and the sidewall 14 of the seat 1.

A side in the width direction of the second optical member 7 may be connected with the first optical member 3, and the other side abuts against the reflector 6. In an embodiment, the second optical member 7 and the first optical member 3 are adhered together by glue. In an embodiment, the second optical member 7 and the first optical member 3 are connected by fasteners. In an embodiment, the second optical member 7 and the first optical member 3 are integrated through composite connection.

The second optical member 7 may be provided with one or more functions of permeability, diffusion, light redirection and focusing.

In an embodiment, the second optical member 7 is made of sheet-shaped material and is provided with functions of diffusion and permeability.

In an embodiment, the second optical member 7 has an incident surface 71 and an emitting surface 72. The incident surface 71 corresponds to the second light source 22. The emitting surface 72 may be configured into a substantially flat surface. In an embodiment, the emitting surface 72 is configured into a flat surface. In an embodiment, the emitting surface 72 is configured into an arcuate surface.

The incident surface 71 is disposed with a redirecting unit 711 to redirect the light emission of the second light source 22. In detail, the redirecting unit 711 projects the light emission of the second light source 22 onto a position of the first optical member 3, which is away from the second light source 22. A cross-section of the redirecting unit 711 is a triangle or a substantial triangle. The redirecting unit 711 are configured to be multiple in number and arranged on the second optical member 7 in a matrix. Furthermore, the incident surface 71 of the second optical member 7 may be configured into a Fresnel lens.

In an embodiment, the reflector 6 and the second optical member 7 are integratedly formed with plastic or acrylic material. During the forming process, a flat plastic or acrylic plate is heatedly pressed with a shape of the incident surface 71 of the second optical member 7 first, and then different positions of the plate are heatedly pressed and bent to make it form a required shape.

In an embodiment, the reflector 6 and the second optical member 7 are made of the same material.

In an embodiment, the reflector 6 and the second optical member 7 are made of different materials, and the both are formed into a whole by welding.

In an embodiment, the second optical member 7 and the first optical member 3 are integratedly formed. A section of the second optical member 7 along the width direction, which is away from the first optical member 1, abuts against the reflector 6. The reflector 6, the second optical member 7, the first optical member 3 and the side portion 12 of the seat 1 jointly form the closed space 101 to limit the second light source 22 therein so as to reduce the influence to the second light source 22 from outside environment and improve service life and reliability of the second light source 22. Also, because the closed space 101 limits the second light source 22, users cannot directly observe the second light source 22 no matter what angle and position the LED lighting device is installed at so as to reduce glare.

In an embodiment, the first optical member 3, the reflector 6 and the second optical member 7 are integratedly formed with one or more materials.

The above embodiments only illustrate the principles and effects of the present disclosure, but are not intended to limit the present disclosure. Many embodiments and many applications beyond the shown examples provided will be apparent to those skilled in the art from reading the above description. The scope of the present teachings, therefore, should be determined, not with reference to the foregoing description, but rather with reference to the appended claims, along with the full scope of equivalents to which such claims are entitled. For purposes of comprehensiveness, the disclosures of all articles and references, including patent applications and publications, are hereby incorporated by reference. The omission of any aspect of the subject matter disclosed herein from the claims is not intended to be a disclaimer of such subject matter, nor should it be deemed that the inventor failed to consider such subject matter to be part of the disclosed subject matter. In addition, the above-mentioned features of the disclosure can be arranged and combined in any manner and used to improve LED lighting devices.

What is claimed is:

1. An LED lighting device, comprising:

a seat comprising a bottom portion with four sides, two side portions and two sidewalls, the two side portions connected to two opposite sides of the bottom portion respectively and the two sidewalls connected to another two opposite sides of the bottom portion respectively;

a power supply disposed on the bottom portion;

a power cap disposed on the bottom portion and covering the power supply;

a light source comprising a first light source and a second light source, the first light source disposed on the bottom portion and arranged at two sides of the power cap, the second light source disposed on the side portions;

an optical member disposed on the seat, the optical member comprising a first portion and two second portions connected to the first portion, the first portion covered the first light source and the power cap, the two second portions attached to the two side portion of the seat respectively; and a reflector connected to an end of each of the side portions and covered the second light source, wherein a part of the light emitted from the first light source transmits through the first portion of the optical member and then goes out of the LED lighting device, a part of the light emitted from the second light source is reflected by the reflector and then goes to the second portions of the optical member.

2. The LED lighting device according to claim 1, wherein the first portion of the optical member comprises a convex surface and each of the second portions comprises a concave surface.

3. The LED lighting device according to claim 2, wherein the power cap is fixed to the bottom portion of the seat and forms a first space with the bottom portion, the power supply is disposed in the first space and electrically connects to the first light source and the second light source.

4. The LED lighting device according to claim 3, wherein the power cap comprises two connecting walls connected to the bottom portion, the first light source is disposed closed to the two connecting walls.

5. The LED lighting device according to claim 4, wherein a part of the light emitted from the first light source is reflected by the two connecting walls of the power cap and then transmits through the first portion of the optical member.

6. The LED lighting device according to claim 5, wherein further comprises a second optical member connected to the second portion of the optical member and the reflector.

7. The LED lighting device according to claim 6, wherein the second optical member, the second portion of the optical member and the reflector forms a second space, the second light source is disposed in the second space.

8. The LED lighting device according to claim 7, wherein the second optical member comprises a light incident surface and a light emitting surface, the second optical member further comprises a plurality of redirecting units arranged on the incident surface.

9. The LED lighting device according to claim 8, wherein the light emitting surface of the second optical member is a flat surface or an arcuate surface.

10. The LED lighting device according to claim 9, wherein a cross-section of the redirecting unit is a triangle structure.

* * * * *